(12) United States Patent
Sato

(10) Patent No.: US 11,835,005 B2
(45) Date of Patent: Dec. 5, 2023

(54) FUEL INJECTION CONTROLLER FOR VESSEL ENGINES, VESSEL ENGINE, VESSEL PROPULSION APPARATUS, AND VESSEL

(71) Applicant: YAMAHA HATSUDOKI KABUSHIKI KAISHA, Iwata (JP)

(72) Inventor: Hiroki Sato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/882,740

(22) Filed: Aug. 8, 2022

(65) Prior Publication Data

US 2023/0058745 A1 Feb. 23, 2023

(30) Foreign Application Priority Data

Aug. 17, 2021 (JP) .................. 2021-132967

(51) Int. Cl.
*F02D 41/14* (2006.01)
*F02D 41/32* (2006.01)
*B63H 21/14* (2006.01)

(52) U.S. Cl.
CPC ......... *F02D 41/1401* (2013.01); *B63H 21/14* (2013.01); *F02D 41/32* (2013.01);
(Continued)

(58) Field of Classification Search
CPC .............. B63H 2021/216; B63H 21/14; F02D 2041/1412; F02D 2041/1432;
(Continued)

(56) References Cited

U.S. PATENT DOCUMENTS

| | | | | | |
|---|---|---|---|---|---|
| 4,886,030 A | * | 12/1989 | Oba | ........................ | F02D 41/10 |
| | | | | | 123/492 |
| 5,003,950 A | * | 4/1991 | Kato | ....................... | F02D 41/32 |
| | | | | | 73/114.22 |

(Continued)

FOREIGN PATENT DOCUMENTS

| | | |
|---|---|---|
| JP | 3330234 B2 | 9/2002 |
| JP | 2005-069045 A | 3/2005 |
| JP | 2012-154287 A | 8/2012 |

*Primary Examiner* — Carl C Staubach
(74) *Attorney, Agent, or Firm* — Keating & Bennett, LLP

(57) ABSTRACT

A fuel injection controller for a vessel engine to drive a propulsion apparatus mounted in a vessel is configured or programmed to execute functions of an effective opening area calculator to calculate an effective opening area of a throttle valve based on a throttle opening degree of the vessel engine, a filter value calculator to determine a first-order lag filter value of the effective opening area, a correction value calculator to determine a ratio of the effective opening area to the first-order lag filter value as a correction value, a predictive suction pressure calculator to determine predictive suction pressure by multiplying an average value of suction pressure detected at a suction passage by the correction value determined by the correction value calculator, a fuel injection amount calculator to calculate a fuel injection amount based on the predictive suction pressure, and a fuel injection driver to drive a fuel injector based on the fuel injection amount.

10 Claims, 7 Drawing Sheets

(52) U.S. Cl.
CPC ........... *F02D 2041/1412* (2013.01); *F02D 2041/1432* (2013.01); *F02D 2200/0404* (2013.01); *F02D 2200/0408* (2013.01); *F02D 2200/101* (2013.01)

(58) Field of Classification Search
CPC ..... F02D 2200/0404; F02D 2200/0406; F02D 2200/0408; F02D 2200/101; F02D 41/1401; F02D 41/32; F02D 41/345
See application file for complete search history.

(56) References Cited

U.S. PATENT DOCUMENTS

| | | | | |
|---|---|---|---|---|
| 5,349,933 | A * | 9/1994 | Hasegawa | F02D 41/182 |
| | | | | 123/492 |
| 5,549,092 | A * | 8/1996 | Hasegawa | F02D 41/32 |
| | | | | 123/492 |
| 10,267,251 | B2 * | 4/2019 | Schuele | F02D 35/023 |
| 2002/0078924 | A1 * | 6/2002 | Yagi | F02D 11/105 |
| | | | | 123/399 |
| 2005/0103309 | A1 * | 5/2005 | Nakagawa | F02D 41/0002 |
| | | | | 123/350 |

* cited by examiner

FUEL INJECTION CONTROLLER FOR VESSEL ENGINES, VESSEL ENGINE, VESSEL PROPULSION APPARATUS, AND VESSEL

CROSS REFERENCE TO RELATED APPLICATIONS

This application claims the benefit of priority to Japanese Patent Application No. 2021-132967 filed on Aug. 17, 2021. The entire contents of this application are hereby incorporated herein by reference.

BACKGROUND OF THE INVENTION

1. Field of the Invention

The present invention relates to a fuel injection controller for vessel engines, a vessel engine, a vessel propulsion apparatus, and a vessel.

2. Description of the Related Art

A conventional technique disclosed by U.S. Pat. No. 5,549,092 aims to provide a fuel injection controller of an internal combustion engine that is capable of determining an optimal amount of fuel injection in all operating states including a transient operating state. This controller searches a map according to the engine speed and suction pressure, and determines a fuel injection amount Timap. The fuel injection amount Timap is set to achieve a target air-fuel ratio (A/F) in a steady operating state. On the other hand, a first-order lag value of a throttle opening degree is determined, and, based on the resulting value, a first-order lag value of an effective throttle opening area is determined. The fuel injection amount Timap is multiplied by the ratio of an effective throttle opening area (present value) to the first-order lag value of the effective throttle opening area, and, as a result, a fuel injection amount TTH corresponding to an amount of air that has passed through the throttle is calculated. Additionally, this fuel injection amount TTH is corrected by an injection correction amount ΔTi that corresponds to an amount of chamber-filling air, and an output fuel injection amount Tout is determined.

SUMMARY OF THE INVENTION

The inventor of preferred embodiments of the present invention described and claimed in the present application conducted an extensive study and research regarding a fuel injection controller, such as the one described above, and in doing so, discovered and first recognized new unique challenges and previously unrecognized possibilities for improvements as described in greater detail below.

Efficient combustion is enabled by achieving the target air-fuel ratio at the time of combustion. However, a non-negligible calculation time exists particularly during a period of time from the detection of suction pressure to the completion of calculation of the fuel injection amount, and therefore it is not easy to achieve the target air-fuel ratio in a transient operating state (particularly, an acceleration operating state).

The conventional technique of U.S. Pat. No. 5,549,092 determines the fuel injection amount Timap by performing a map search based on the suction pressure and the engine speed. However, in the transient operating state, a non-negligible change in the suction pressure occurs during a period of time from the detection of suction pressure to the closure of a suction valve, and therefore the fuel injection amount Timap does not become an adequate value that enables the achievement of the target air-fuel ratio. The output fuel injection amount Tout that is obtained by correcting the fuel injection amount Timap is expected to become a value closer to the adequate value than the fuel injection amount Timap, and yet there is still room for improvement.

Preferred embodiments of the present invention provide fuel injection controllers each improving a combustion state of a vessel engine. Additionally, preferred embodiments of the present invention provide vessel engines including the fuel injection controller improving a combustion state, vessel propulsion apparatuses including the fuel injection controller, and vessels including the fuel injection controller.

In order to overcome the previously unrecognized and unsolved challenges described above, a preferred embodiment of the present invention provides a fuel injection controller for a vessel engine to drive a propulsion apparatus mounted in a vessel. The fuel injection controller is configured or programmed to execute functions of an effective opening area calculator to calculate an effective opening area of a throttle valve of the vessel engine based on a throttle opening degree of the vessel engine, a filter value calculator to determine a first-order lag filter value of the effective opening area determined by the effective opening area calculator, a correction value calculator to determine a ratio of the effective opening area to the first-order lag filter value as a correction value, a predictive suction pressure calculator to determine predictive suction pressure by multiplying an average value of suction pressure detected at a suction passage (preferably, a suction passage portion behind the throttle valve) of the vessel engine by the correction value determined by the correction value calculator, a fuel injection amount calculator to calculate a fuel injection amount based on the predictive suction pressure determined by the predictive suction pressure calculator, and a fuel injection driver to drive a fuel injector of the vessel engine based on the fuel injection amount calculated by the fuel injection amount calculator.

The ratio of the effective opening area to the first-order lag filter value represents the degree of a change in the effective opening area, and is an index to the transient operating state (particularly, an acceleration operating state) of the engine. Therefore, the value of the ratio is used as a correction value by which the present suction pressure is corrected and by which suction pressure (predictive suction pressure) in the future is determined. More specifically, the predictive suction pressure is determined by multiplying the average value of suction pressure detected at the suction passage of the engine by the correction value (the value of the above-described ratio). Based on the predictive suction pressure, the fuel injection amount is calculated, and therefore the resultant fuel injection amount reaches a value approximating an adequate value (specifically, a value of a fuel injection amount by which a target air-fuel ratio is achieved with high accuracy). As a result, it is possible to improve a combustion state.

If a fuel injection amount is determined by use of suction pressure that is not corrected and if the resultant fuel injection amount is corrected in accordance with a transient operating state, this correction will be deficient when a simple calculation, in which the correction value is multiplied as described above, is performed, and the fuel injection amount obtained by the correction will not reach an adequate value unless a more complicated calculation is performed. For example, if the relationship of a fuel injection amount to suction pressure is not substantially linear, it is impossible to obtain a fuel injection amount appropriate for the suction pressure at the point of time when fuel is injected. On the other hand, in a preferred embodiment of the present invention, the fuel injection amount is determined based on predictive suction pressure, and therefore the resultant fuel injection amount is a value adequate to predictive suction pressure. Additionally, the predictive suction pressure is a proper value that is obtained through correction by use of the ratio between an effective opening area and its filter value. This makes it possible to determine a fuel injection amount approximating an adequate value, thus making it possible to realize an excellent combustion state.

In a preferred embodiment of the present invention, the predictive suction pressure calculator is configured or programmed to compare the correction value determined by the correction value calculator and a predetermined threshold value with each other, and select either one of a value obtained by multiplying an average value of suction pressure detected at the suction passage by the correction value and the average value of the suction pressure based on a resultant comparison result, and set the selected value as the predictive suction pressure.

If the predetermined threshold value is appropriately set, it is possible to discriminate between a stationary state in which suction pressure does not largely vary for a short time and a transient operating state in which suction pressure largely varies for a short time based on a comparison result between the correction value and the threshold value. In the transient operating state, it is appropriate to set a value obtained by correcting a suction pressure average value by use of the correction value as predictive suction pressure, and, in the stationary state, it is possible to obtain proper suction pressure if the suction pressure average value is set as predictive suction pressure. This makes it possible to realize an excellent combustion state either in the stationary state or in the transient operating state.

In a preferred embodiment of the present invention, when the correction value determined by the correction value calculator exceeds a first threshold value, the predictive suction pressure calculator is configured or programmed to determine predictive suction pressure by multiplying the average value of suction pressure detected at the suction passage by the correction value, and, when the correction value becomes less than a second threshold value equal to or less than the first threshold value, the predictive suction pressure calculator is configured or programmed to set the average value of the suction pressure as predictive suction pressure.

If the first threshold value and the second threshold value are appropriately set, it is possible to regard the engine as being in a stationary state in which suction pressure does not largely vary for a short time when the correction value is less than the second threshold value, whereas it is possible to regard the engine as being in a transient operating state in which suction pressure largely varies for a short time when the correction value exceeds the first threshold value. Thus, the predictive suction pressure is determined by correcting the suction pressure average value by use of the correction value in the transient operating state, whereas the suction pressure average value is used as the predictive suction pressure without being corrected in the stationary state. Thus, the switching between the presence and absence of correction is performed depending on the state, and, as a result, it is possible to obtain proper predictive suction pressure, and it is possible to realize an excellent combustion state in either of the stationary state and the transient operating state.

The first threshold value and the second threshold value may be equal to each other. Additionally, the second threshold value may be smaller than the first threshold value. When the second threshold value is smaller than the first threshold value, it becomes possible to provide hysteresis to switching between a state in which correction is effective and a state in which correction is ineffective, thus making it possible to significantly reduce or prevent chattering.

In a preferred embodiment of the present invention, the vessel engine is a four-stroke engine. The fuel injection driver drives the fuel injector so that fuel is injected at a predetermined fuel injection timing. The predictive suction pressure calculator is configured or programmed to calculate predictive suction pressure at an end of a suction stroke at a calculation timing prior to the fuel injection timing.

If the suction pressure at the end of the suction stroke (more specifically, at a timing at which the suction valve is closed) is confirmed, it is possible to accurately determine an amount of air introduced into a combustion chamber. A fuel injection amount appropriate to this amount of air is set, thus making it possible to achieve a target air-fuel ratio (for example, an ideal air-fuel ratio). A period of time is required from the point of time when a fuel injection amount is calculated after the detection of suction pressure to the point of time when fuel corresponding to the resultant fuel injection amount is injected, and therefore a fuel injection amount must be beforehand calculated in consideration of this period of time. To do so, practically, the fuel injection amount must be calculated before the end of the suction stroke. Therefore, suction pressure at the end of the suction stroke is predicted by use of a first-order lag filter value based on suction pressure detected before the end of the suction stroke. The use of the predicted suction pressure makes it possible to beforehand calculate an appropriate fuel injection amount, thus making it possible to improve a combustion state.

In a preferred embodiment of the present invention, the fuel injection amount calculator includes a volumetric efficiency calculator to calculate volumetric efficiency based on the predictive suction pressure calculated by the predictive suction pressure calculator and based on a rotation speed of the vessel engine, and the fuel injection amount calculator is configured or programmed to calculate a fuel injection amount based on the volumetric efficiency calculated by the volumetric efficiency calculator.

The use of the predictive suction pressure makes it possible to accurately determine volumetric efficiency and makes it possible to determine an appropriate fuel injection amount correspondingly. This makes it possible to improve a combustion state.

In a preferred embodiment of the present invention, the fuel injection amount calculator includes an air-fuel-ratio request value calculator to calculate an air-fuel ratio request value based on the predictive suction pressure calculated by the predictive suction pressure calculator and based on a rotation speed of the vessel engine, and the fuel injection amount calculator is configured or programmed to calculate a fuel injection amount based on the air-fuel ratio request value calculated by the air-fuel-ratio request value calculator.

The use of the predictive suction pressure makes it possible to calculate an appropriate air-fuel ratio request value and thus makes it possible to determine a proper fuel injection amount by which the appropriate air-fuel ratio is achieved. This makes it possible to improve a combustion state.

In a preferred embodiment of the present invention, a relationship of a fuel injection amount calculated by the fuel injection amount calculator with respect to the predictive suction pressure is nonlinear.

If the relationship between the suction pressure and the fuel injection amount is nonlinear, it is impossible to determine a fuel injection amount approximating the adequate value even if the fuel injection amount calculated based on the detected suction pressure is corrected based on the correction value described above, and a more complicated calculation is required. In the present preferred embodiment, the predictive suction pressure is determined while correcting the detected suction pressure, and, based on the resultant predictive suction pressure, a fuel injection amount is determined. This configuration makes it possible to determine a proper fuel injection amount without performing a complicated calculation even if the relationship between the suction pressure and the fuel injection amount is nonlinear.

Another preferred embodiment of the present invention provides a vessel engine including a throttle opening degree sensor to detect a throttle opening degree, a suction pressure sensor to detect suction pressure at a suction passage, a fuel injector to inject fuel, and the fuel injection controller described above.

Another preferred embodiment of the present invention provides a vessel propulsion apparatus including the vessel engine described above and a propulsion member to be driven by the vessel engine.

Another preferred embodiment of the present invention provides a vessel including a hull and the above-described vessel propulsion apparatus mounted on the hull.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
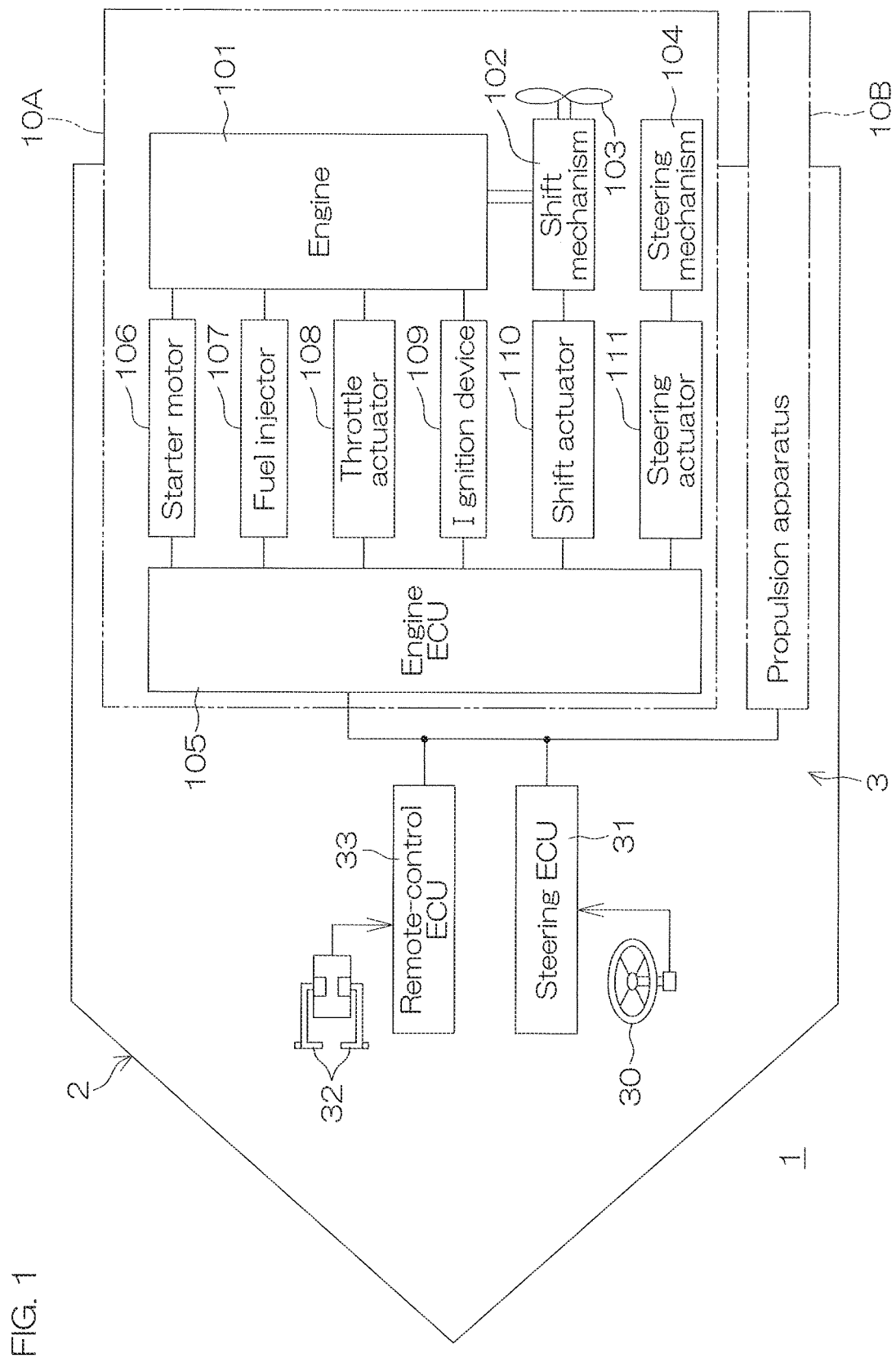
FIG. 1 is a block diagram shown to describe a configuration of a vessel according to a preferred embodiment of the present invention.

FIG. 1 is a block diagram shown to describe a configuration of a vessel according to a preferred embodiment of the present invention. The vessel 1 may be a small vessel called a pleasure boat, for example. The vessel 1 includes a hull 2 and a vessel operation system 3. The vessel operation system 3 includes propulsion apparatuses 10A and 10B (which are referred to collectively as "propulsion apparatus 10" if necessary) and operation units 30 and 32 operated by a user.

The propulsion apparatus 10 is an example of a vessel propulsion apparatus, and, in the present preferred embodiment, a plurality of (more specifically, two) propulsion apparatuses are provided. Of course, the number of propulsion apparatuses 10 may be one, or may be three or more. The propulsion apparatus 10 may be an outboard motor disposed at a transom stern. The propulsion apparatus 10 is an engine propulsion apparatus that uses an engine 101, which is an example of a vessel engine, as a driving source. The propulsion apparatus 10 is provided with the engine 101, a shift mechanism 102, a propeller 103, a steering mechanism 104, etc. The engine 101 is a four-stroke internal combustion engine in the present preferred embodiment. Power generated by the engine 101 is transmitted to the propeller 103 through the shift mechanism 102. The propeller 103 is an example of a propulsion member. The steering mechanism 104 is a mechanism by which the direction of a thrust generated by the propulsion apparatus 10 is changed rightwardly or leftwardly, and, in the outboard motor, the steering mechanism 104 turns the outboard motor rightwardly or leftwardly with respect to the hull. The shift mechanism 102 is configured to select any one of shift positions, i.e., select any one of a forward position, a rearward position, and a neutral position. When the shift position is the forward position, the rotation of the engine 101 is transmitted such that the propeller 103 rotates in a normal rotation direction. When the shift position is the rearward position, the rotation of the engine 101 is transmitted such that the propeller 103 rotates in a reverse rotation direction. When the shift position is the neutral position, the power transmission between the engine 101 and the propeller 103 is shut off.

The propulsion apparatus 10 is additionally provided with an engine ECU 105, a starter motor 106, a fuel injector (injector) 107, a throttle actuator 108, an ignition device 109, a shift actuator 110, a steering actuator 111, etc. The fuel injector 107 is a device provided in the engine 101. The engine ECU 105 controls the operation of the starter motor 106, the operation of the fuel injector 107, the operation of the throttle actuator 108, the operation of the ignition device 109, the operation of the shift actuator 110, and the operation of the steering actuator 111. The starter motor 106 is an electric motor by which the engine 101 is started. The fuel injector 107 is a device that injects fuel that is combusted in the engine 101. The engine ECU 105 defines and functions as a fuel injection controller that controls the fuel injector 107. The throttle actuator 108 is an electrically-operated actuator (which typically includes an electric motor) that actuates a throttle valve of the engine 101. The ignition device 109 is a device that ignites an air-fuel mixture in a combustion chamber of the engine 101, and typically includes an ignition plug and an ignition coil. The ignition plug is a device provided in the engine 101. The shift actuator 110 is an actuator by which the shift mechanism 102 is actuated. The steering actuator 111 is a driving source of the steering mechanism 104, and typically includes an electric motor. The steering actuator 111 may include a motor-pump type hydraulic system.

The operation units 30 and 32 include a steering wheel 30 and a remote-control lever 32 in the present preferred embodiment. A steering ECU (electronic control unit) 31 and a remote-control ECU 33 are provided so as to correspond to the steering wheel 30 and the remote-control lever 32, respectively. The steering ECU 31 and the remote-control ECU 33 are communicably connected to the engine ECU 105.

The steering wheel 30 is an operation member operated by the user in order to perform an operation by which a traveling direction of the vessel 1 is determined, i.e., in order to perform a steering operation. In the present preferred embodiment, the direction of a thrust generated by the propulsion apparatus 10 changes rightwardly and leftwardly in accordance with the operation of the steering wheel 30, and, as a result, steering is achieved. The remote-control lever 32 is an operation member operated by the user by which the shift position of the propulsion apparatus 10 and the output of the propulsion apparatus 10 are set/adjusted, i.e., by which the direction and the magnitude of a thrust generated by the propulsion apparatus 10 are set/adjusted. More specifically, the remote-control lever 32 is an operation member operated by the operator in order to adjust the throttle opening degree of the engine 101, and can be referred to alternatively as an acceleration operation element or as a throttle operation element. In the present preferred embodiment, two remote-control levers 32 are provided so as to correspond to two propulsion apparatuses 10.

Figure 2:
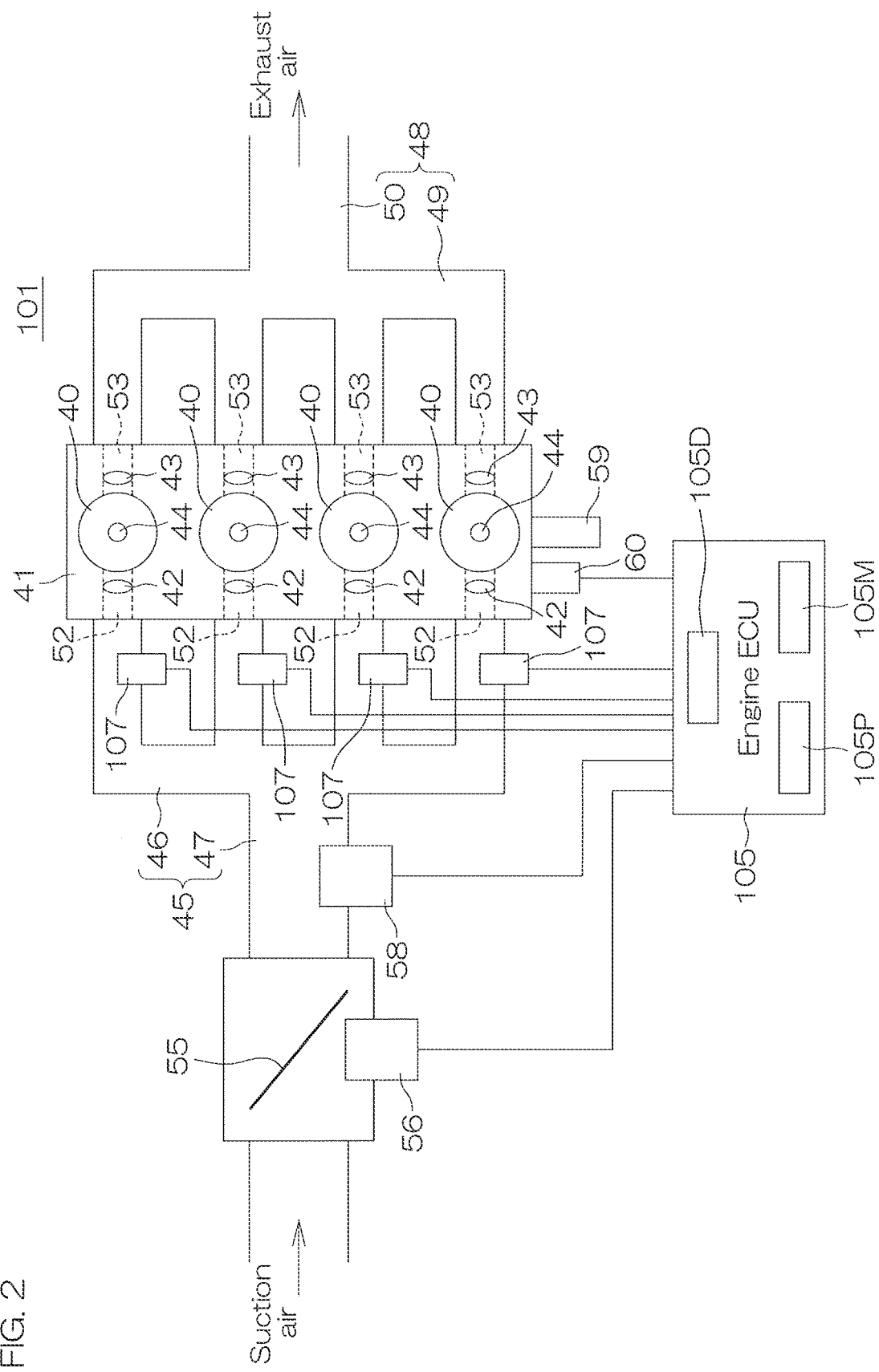
FIG. 2 illustratively shows a configuration example relating to an engine of the vessel.

FIG. 2 illustratively shows a configuration example relating to the engine 101. In this example, the engine 101 is a four-cylinder internal combustion engine. A suction manifold 46 and an exhaust manifold 49 are joined to a cylinder body 41 including four cylinders 40. The cylinder body 41 is provided with a suction valve 42, an exhaust valve 43, and an ignition plug 44 for each of the cylinders 40. The suction valve 42 opens and closes a suction port 52 disposed between the suction manifold 46 and a combustion chamber inside the cylinder 40. The exhaust valve 43 opens and closes an exhaust port 53 disposed between the combustion chamber inside the cylinder 40 and the exhaust manifold 49. The ignition plug 44 performs a spark discharge in the combustion chamber, and ignites an air-fuel mixture in the combustion chamber. In this example, the fuel injector 107 is disposed at a position near the suction valve 42 in the suction manifold 46. The fuel injector 107 injects fuel (so-called port injection) into a suction passage on the upstream side of the suction valve 42 (more specifically, into the suction port 52). Understandably, this layout is an example. In other words, the fuel injector 107 may be disposed so as to inject fuel into the cylinder 40 (so-called direct injection).

The suction manifold 46 is joined to a collecting suction pipe 47. The suction manifold 46 and the collecting suction pipe 47 define a suction passage 45. A throttle valve 55 is interposed in the collecting suction pipe 47. A throttle opening degree sensor 56 that detects the opening degree of the throttle valve 55 is disposed in association with the throttle valve 55. A suction pressure sensor 58 that detects suction pressure is disposed on the downstream side of the suction passage 45 (more specifically, the collecting suction pipe 47) with respect to the throttle valve 55. The suction pressure sensor 58 detects air pressure in the suction passage 45 between the throttle valve 55 and the suction valve 42.

The exhaust manifold 49 is joined to a collecting exhaust pipe 50. The exhaust manifold 49 and the collecting exhaust pipe 50 define an exhaust passage 48. A catalytic converter, not shown, by which an exhaust gas is detoxified may be disposed at the exhaust passage 48. An air-fuel ratio sensor, also not shown, may be disposed at the exhaust passage 48.

A crank angle sensor 60 that generates a crank pulse in accordance with the rotation of a crankshaft 59 is disposed in association with the cylinder body 41.

An output signal of the throttle opening degree sensor 56, an output signal of the suction pressure sensor 58, and an output signal of the crank angle sensor 60 are input into the engine ECU 105. The engine ECU 105 controls and drives the fuel injector 107 and the ignition plug 44 of each of the cylinders 40. The engine ECU 105 performs various calculations based on input signals sent from the above-described sensors, and drives the fuel injector 107 of each of the cylinders 40 at an appropriate fuel injection timing, and injects fuel, and causes the ignition plug 44 of each of the cylinders 40 to perform a spark discharge at an appropriate ignition timing.

The engine ECU 105 includes a processor 105P (CPU), a memory 105M, and driving circuits 105D. The memory 105M stores a program that is executed by the processor 105P, and additionally stores data used to calculate and control operations. The processor 105P executes the program, thus enabling the engine ECU 105 to have a function as a plurality of functional processing units. In other words, the engine ECU 105 substantially includes a plurality of functional processing units, and is programmed to execute a function as these functional processing units.

Figure 3:
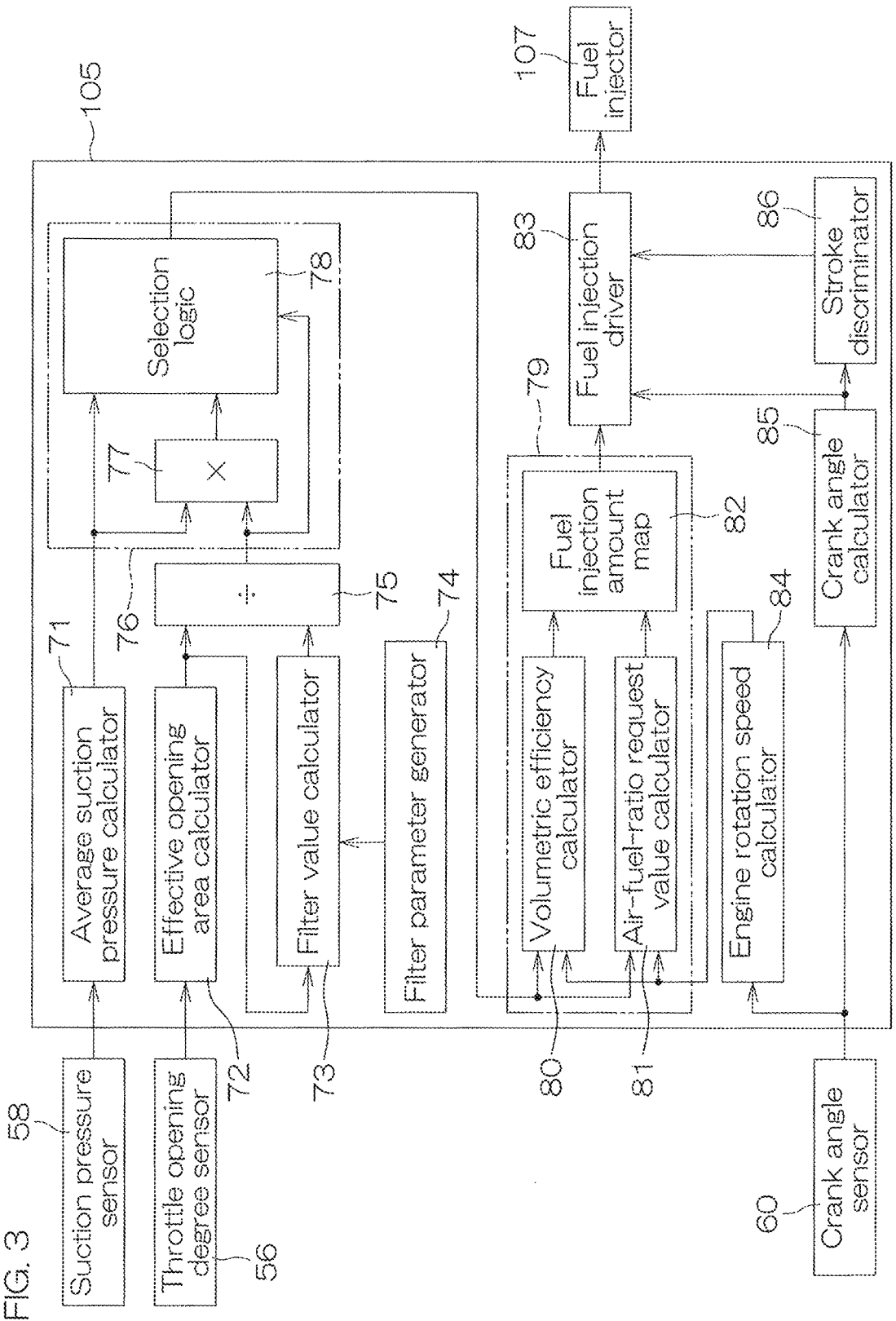
FIG. 3 is a block diagram shown to describe a functional configuration of an engine ECU, and mainly shows a configuration for fuel injection control.

FIG. 3 is a block diagram shown to describe a functional configuration of the engine ECU 105, and mainly shows a configuration for fuel injection control. In other words, a function as a fuel injection controller of the engine ECU 105 is shown. The functional processing units substantially possessed by the engine ECU 105 include an effective opening area calculator 72, a filter value calculator 73, a correction value calculator 75, a predictive suction pressure calculator 76, and a fuel injection amount calculator 79. The functional processing units additionally include an average suction pressure calculator 71. The functional processing units additionally include an engine rotation speed calculator 84, a crank angle calculator 85, and a stroke discriminator 86. The functional processing units additionally include a fuel injection driver 83. The fuel injection driver 83 may include hardware, such as a driving circuit to drive the fuel injector 107.

The effective opening area calculator 72 calculates an effective opening area of the throttle valve 55 based on a throttle opening degree detected by the throttle opening degree sensor 56. The effective opening area calculator 72 may include an opening-area map that stores an effective opening area corresponding to a throttle opening degree.

The filter value calculator 73 performs a filter process in which a first-order lag filter value determined by the effective opening area calculator 72 is determined. Parameters for the filter process are provided from a filter parameter generator 74. The correction value calculator 75 determines the ratio of an effective opening area to a first-order lag filter value determined by the filter value calculator 73 as a correction value. More specifically, the correction value calculator 75 determines a correction value by dividing the effective opening area by the first-order lag filter value.

The average suction pressure calculator 71 determines a suction pressure average value by applying an averaging procedure to a suction pressure value detected by the suction pressure sensor 58. More specifically, an output signal of the suction pressure sensor 58 is sampled at a predetermined sampling period, and is digitalized. The average suction pressure calculator 71 determines an average value of a recent predetermined number of sampling values as a suction pressure average value.

The predictive suction pressure calculator 76 calculates predictive suction pressure by multiplying a suction pressure average value by a correction value calculated by the correction value calculator 75. More specifically, the predictive suction pressure calculator 76 includes a multiplier 77 that multiplies a suction pressure average value by a correction value. In the present preferred embodiment, the predictive suction pressure calculator 76 additionally includes a selection logic 78. The selection logic 78 compares a correction value and a threshold value with each other, and selects either one of a suction pressure average value and a multiplication result of the multiplier 77 based on its comparison result, and outputs the selected value as predictive suction pressure. More specifically, the selection logic 78 selects an output value of the multiplier 77 when the correction value exceeds a first threshold value, and the selection logic 78 selects an output value of a suction pressure average value calculator when the correction value becomes less than a second threshold value, and the selection logic 78 outputs this value selected as predictive suction pressure. The second threshold value is equal to or less than the first threshold value. The filter value calculator 73 and the predictive suction pressure calculator 76 are designed so as to generate suction pressure at the end of a suction stroke (more specifically, at a timing at which the suction valve 42 is closed) as predictive suction pressure.

The fuel injection amount calculator 79 calculates a fuel injection amount based on predictive suction pressure generated by the predictive suction pressure calculator 76. The fuel injection amount calculator 79 includes a volumetric efficiency calculator 80. The fuel injection amount calculator 79 additionally includes an air-fuel-ratio request value calculator 81. The fuel injection amount calculator 79 further includes a fuel injection amount map 82. The volumetric efficiency calculator 80 calculates the volumetric efficiency of the cylinder 40 based on predictive suction pressure calculated by the predictive suction pressure calculator 76 and based on an engine rotation speed calculated by an engine rotation speed calculator 84. The air-fuel-ratio request value calculator 81 calculates an air-fuel ratio request value based on predictive suction pressure calculated by the predictive suction pressure calculator 76 and based on an engine rotation speed calculated by the engine rotation speed calculator 84. For example, the air-fuel ratio request value may be calculated by searching a request air-fuel ratio map by use of the predictive suction pressure and the engine rotation speed. The fuel injection amount map 82 stores a fuel injection amount corresponding to the volumetric efficiency and the air-fuel ratio request value. The fuel injection amount calculator 79 calculates a fuel injection amount by searching the fuel injection amount map 82 by use of the volumetric efficiency and the air-fuel ratio request value. The fuel injection amount calculated in this way becomes a fuel injection amount appropriate to the predictive suction pressure and to the engine rotation speed, in other words, becomes a fuel injection amount appropriate to the operating state of the engine 101.

The engine rotation speed calculator 84 calculates an engine rotation speed based on a crank pulse generated by the crank angle sensor 60, more specifically, based on a time interval of the crank pulse. Additionally, the crank angle calculator 85 calculates a crank angle based on a crank pulse generated by the crank angle sensor 60, i.e., more specifically, calculates a crank angle by counting the number of crank pulses. The stroke discriminator 86 discriminates the stroke of the engine 101 based on a crank angle calculated thereby and the like.

The fuel injection driver 83 drives the fuel injector 107 based on a fuel injection amount calculated by the fuel injection amount calculator 79. More specifically, the fuel injection driver 83 drives the fuel injector 107 so as to inject the calculated fuel at a fuel injection timing that is appropriately fixed based on a crank angle calculated by the crank angle calculator 85 and based on a stroke discriminated by the stroke discriminator 86.

As is well known, in a four-cylinder engine, ignition-timing phases of four cylinders deviate from each other by 180 degrees. In accordance with this, the phases of operations of both the suction valve 42 and the exhaust valve 43 deviate from each other, and therefore there are deviations in the stroke phase among the cylinders. Therefore, the calculation of predictive suction pressure and the calculation of a fuel injection amount based on this are required to be performed in each cylinder. Only the calculation of predictive suction pressure and a configuration for one cylinder relating to the fuel injection are represented in FIG. 4, but, actually, calculation and fuel injection control are performed for four cylinders.

The engine ECU 105 performs the fuel injection control, under which fuel is injected from the fuel injector 107, at an appropriate timing for each of the cylinders 40, and performs the ignition control under which an air-fuel mixture is ignited by the ignition plug 44.

Figure 4:
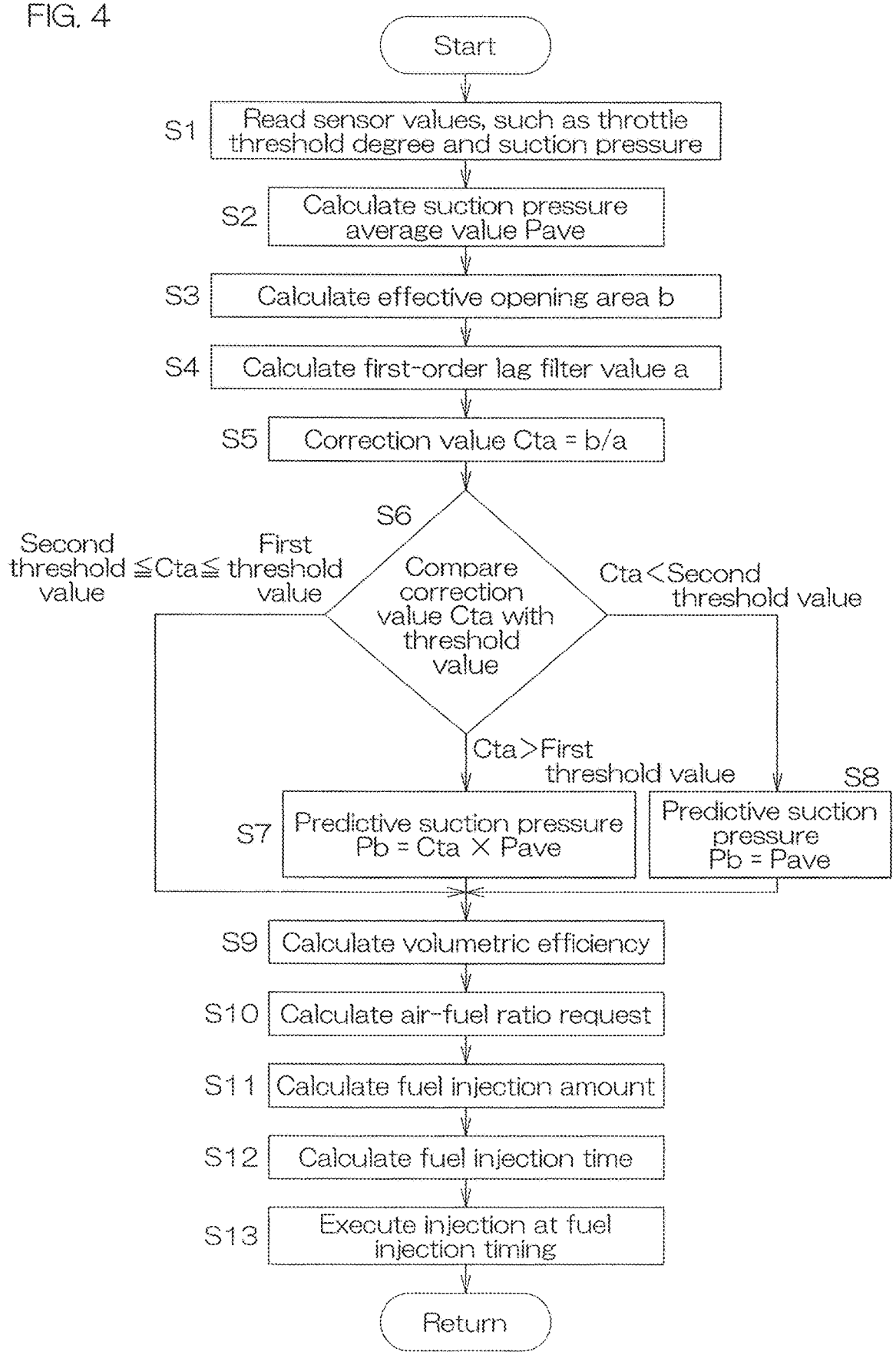
FIG. 4 is a flowchart shown to describe a function of the engine ECU defining and functioning as a fuel injection controller.

FIG. 4 is a flowchart shown to describe a function as a fuel injection controller by the engine ECU 105, and shows an example of a process that is repeatedly performed at each predetermined calculation cycle. The engine ECU 105 reads values of sensors, such as a throttle opening degree detected by the throttle opening degree sensor 56 and suction pressure detected by the suction pressure sensor 58 (step S1). The engine ECU 105 calculates a suction pressure average value Pave (step S2). Additionally, the engine ECU 105 calculates an effective opening area based on a throttle opening degree (step S3), and calculates a first-order lag filter value of the effective opening area (step S4).

The first-order lag filter value a of the effective opening area b is expressed by the following equation by use of a filter parameter c. In the equation, a(n) (n is a natural number) represents the present value of the first-order lag filter value a (value in the present calculation cycle), and a(n−1) represents the previous value of the first-order lag filter value a (value in the previous calculation cycle). The effective opening area b is a value of the present calculation cycle.

$$a(n) = a(n-1) \times c + b \times (1-c)$$

The physical meaning of the filter parameter c is expressed by the following equation.

$c = \tau/(T+\tau)$ where $\tau$ is a time constant, and $T$ is an calculation cycle.

The filter parameter c is generated by the filter parameter generator 74. The filter parameter c can be determined by a simulation or an experiment. The filter parameter c may be a constant value, or may be a value that varies in accordance with an engine rotation speed or the like. Preferably, the filter parameter c is set so that the first-order lag filter value a imitates an effective opening area at the end of a suction stroke (more specifically, at a timing at which the suction valve 42 is closed). Additionally, preferably, the filter parameter c is set so that a value obtained by multiplying a suction pressure average value Pave by a correction value Cta described below imitates suction pressure at the end of a suction stroke (more specifically, at a timing at which the suction valve 42 is closed).

The engine ECU 105 calculates a correction value Cta in accordance with the following equation by use of the effective opening area b and the filter value a (step S5).

$$Cta=b/a(n)$$

Thereafter, the engine ECU 105 compares the correction value Cta with the threshold value (step S6). More specifically, when the correction value Cta exceeds the first threshold value (for example, about 5%), the engine ECU 105 uses a value obtained by multiplying the suction pressure average value Pave by the correction value Cta as a predictive suction pressure Pb (i.e., Pb=Cta×Pave), and makes the correction performed by the correction value Cta effective (step S7). On the other hand, when the correction value Cta becomes less than the second threshold value (for example, about 2%), the engine ECU 105 uses the suction pressure average value Pave as predictive suction pressure Pb (i.e., Pb=Pave), and makes the correction performed by the correction value Cta ineffective (step S8). When the correction value Cta is not less than the first threshold value and not more than the second threshold value, the engine ECU 105 allows a method of calculating the predictive suction pressure Pb to remain in the previous calculation cycle. In other words, an effective/ineffective state of the correction performed by the correction value Cta is made equal to the state in the previous calculation cycle.

The first threshold value and the second threshold value may be equal to each other, or the second threshold value may be smaller than the first threshold value. If the second threshold value is set to be smaller than the first threshold value, it is possible to provide a hysteresis characteristic to the effective/ineffective switching of the correction performed by the correction value Cta, thus making it possible to significantly reduce or prevent chattering.

When the predictive suction pressure Pb is determined in this way, the engine ECU 105 searches a volumetric efficiency map by use of the predictive suction pressure and the engine rotation speed, and determines volumetric efficiency (step S9). Additionally, the engine ECU 105 determines an air-fuel ratio request value by use of the predictive suction pressure and the engine rotation speed (step S10).

The engine ECU 105 calculates a fuel injection amount based on the volumetric efficiency, the air-fuel ratio request value, the air density, etc., determined above (step S11). Additionally, the engine ECU 105 calculates an injection time (=fuel injection amount/injector characteristic coefficient) based on the fuel injection amount and the injector characteristic coefficient (injection amount per unit time) thus determined (step S12).

When a fuel injection timing comes, the engine ECU 105 allows the fuel injector 107 to inject fuel only for the injection time obtained by the calculation (step S13).

Figure 5:
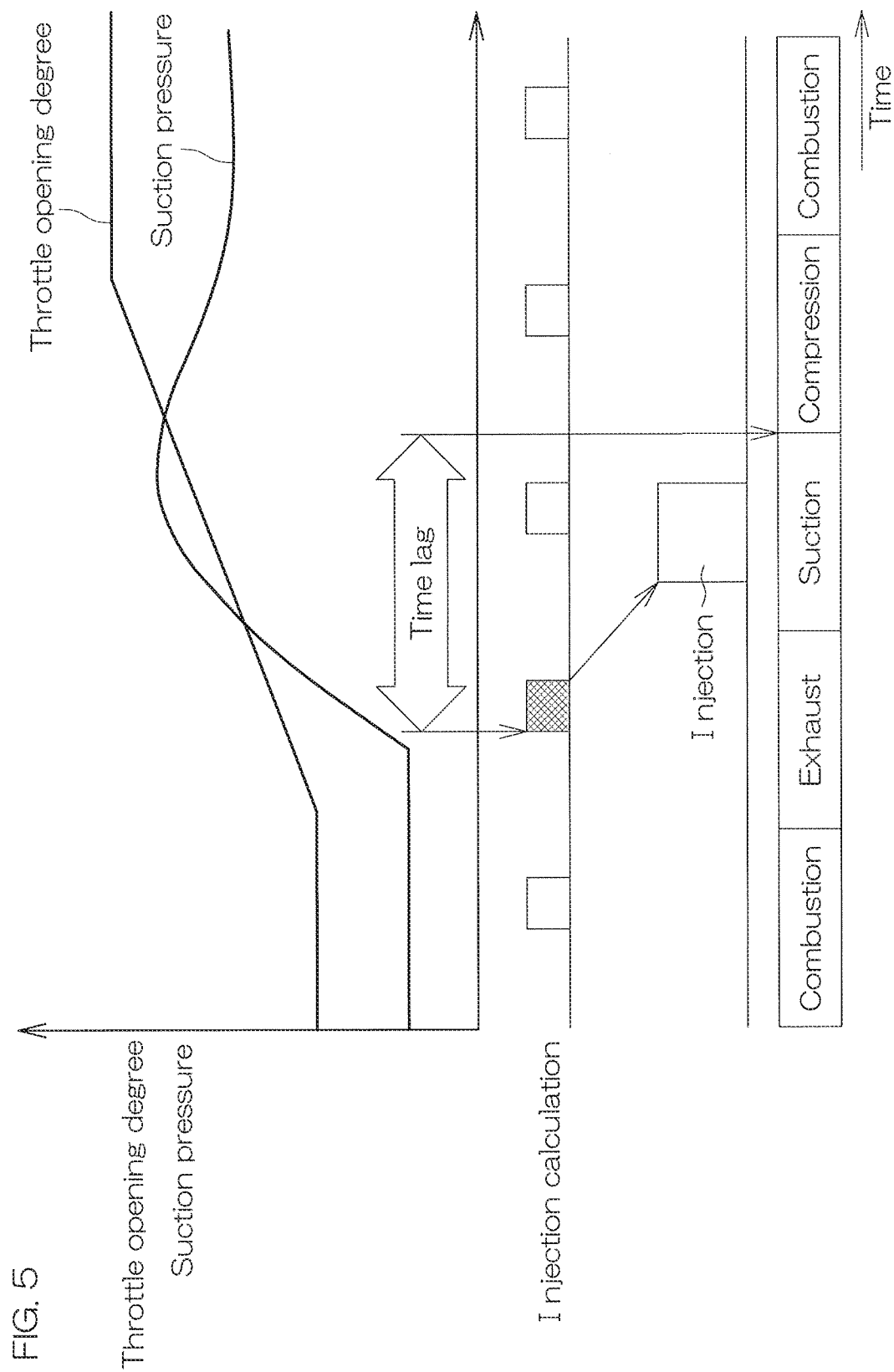
FIG. 5 is a time chart shown to describe an operation example relating to fuel injection.

FIG. 5 is a time chart shown to describe an operation example relating to a fuel injection. One cycle of a four-stroke internal combustion engine includes a suction stroke, a compression stroke, a combustion stroke (expansion stroke), and an exhaust stroke. The suction valve 42 is opened during the suction stroke, and is closed for the other durations. The exhaust valve 43 is opened during the exhaust stroke, and is closed for the other durations. However, during transition from the exhaust stroke to the suction stroke, the overlap duration for which both the suction valve 42 and the exhaust valve 43 are opened may be created.

The fuel injection by the fuel injector 107 is performed at a fuel injection timing that is set during an interval from the exhaust stroke to the compression stroke. More specifically, in the case of port injection, the fuel injection timing is set at any point of time during a period from before the suction valve 42 is opened and during the suction valve 42 is open. On the other hand, in the case of direct injection (cylinder injection), the fuel injection timing is set at any point of time during a period during which the suction valve 42 is open or after the suction valve 42 is closed.

The amount of air in the cylinder 40 is fixed at the end of the suction stroke, i.e., at a timing at which the suction valve 42 is closed, and therefore, if the suction pressure is confirmed at this timing, it is possible to accurately estimate the amount of air introduced into the cylinder 40. It is thus made possible to determine a fuel injection amount that satisfies an air-fuel ratio request value with high accuracy. On the other hand, a proper period of time is required from the calculation of a fuel injection amount based on a detected suction pressure value to the injection of fuel corresponding to this fuel injection amount, and therefore it is necessary to start the calculation of the fuel injection amount before a fuel injection timing. Even in a case in which the fuel injection timing is the latest, i.e., even in a case in which the fuel injection timing is set at the time after the suction valve 42 is closed, it is impossible to ensure that the timing at which the calculation of the fuel injection amount is started is after the suction stroke. If a realistic calculation time and a high-speed rotation state are assumed, it is impossible to set the start timing of calculation of a fuel injection amount at the time after the suction valve 42 is closed. As a result, the value of suction pressure detected before the suction valve 42 is closed must be inevitably used in order to calculate the fuel injection amount. In other words, there is a time lag between a detection timing of suction pressure usable to calculate the fuel injection amount and a detection timing (end of the suction stroke) of suction pressure required to calculate the fuel injection amount.

In a stationary state in which the throttle opening degree does not substantially vary, and thus the effective opening area of the throttle valve 55 does not substantially vary, it is conceivable that there is not a huge difference in the value of suction pressure between a timing at which the fuel injection amount is calculated and a timing at which the suction valve 42 is closed. Therefore, it is possible to achieve an air-fuel ratio request value by use of a suction pressure detection value obtained at a timing at which the fuel injection amount is calculated. On the other hand, in a transient operating state (particularly at an acceleration time during which the throttle opening degree is rapidly increased) in which the throttle opening degree substantially varies, and thus the effective opening area of the throttle valve 55 substantially varies, different circumstances arise. More specifically, there is a concern that the value of suction pressure will largely vary for the duration from a timing at which the fuel injection amount is calculated to a timing at which the suction valve 42 is closed. Therefore, if the suction pressure detection value detected above is used without being changed, it is difficult to achieve an air-fuel ratio request value. More specifically, a lean state in which the amount of air is excessive is reached at the acceleration time.

Therefore, in the transient operating state, a value obtained by estimating the suction pressure at the end of the suction stroke (specifically, at a timing at which the suction valve 42 is closed) is used, i.e., predictive suction pressure Pb obtained by the correction performed by use of the correction value Cta is used in the present preferred embodiment. The air-fuel ratio request value is achieved by calculating the fuel injection amount by use of the predictive suction pressure Pb.

As another solution, it is conceivable that a fuel injection amount to be added is calculated when it is determined that an accelerating operation is being performed while the fuel injection amount is calculated by use of a suction pressure average value Pave at a timing at which the fuel injection amount is calculated without changing the suction pressure average value Pave. In this case, a conformity process that needs a large amount of labor and time is required to obtain a determination value for the determination of an acceleration operation and an additional fuel injection amount. In a concrete conformity process, a propulsion apparatus is attached to a hull, and a vessel is actually sailed, and operational experiments are performed with a huge number of test patterns, and then parameters are determined so as to satisfy a performance target. Furthermore, if conformity is made so as to satisfy the performance target under the worst condition, the injection amount will become excessive under other conditions excluding the worst condition, and therefore the operation time becomes long under conditions on the side richer than the air-fuel ratio request value, and therefore fuel efficiency deteriorates. If the above-described preferred embodiments are used, these problems will not arise.

Figure 6:
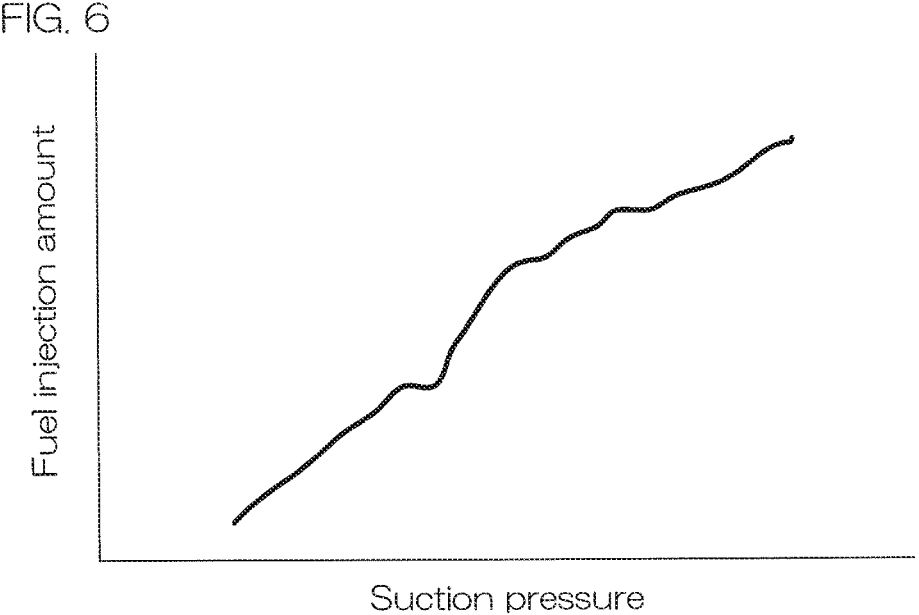
FIG. 6 shows an example of a suction pressure/injection amount characteristic that shows a relationship between suction pressure and an amount of fuel injection at a timing at which a suction valve is closed.

FIG. 6 shows an example of a relationship (suction pressure/injection amount characteristic) between suction pressure at a timing at which the suction valve 42 is closed and a fuel injection amount that satisfies an air-fuel ratio request value. The suction pressure/injection amount characteristic depends on the design of an engine etc., and thus differs depending on the model. As a general tendency, an amount of suction air increases in accordance with an increase in suction pressure, and therefore a fuel injection amount increases in accordance with this. However, an increase in the fuel injection amount with respect to an increase in the suction pressure is not linear but nonlinear, and is not necessarily limited to a monotone increase.

Figure 7:
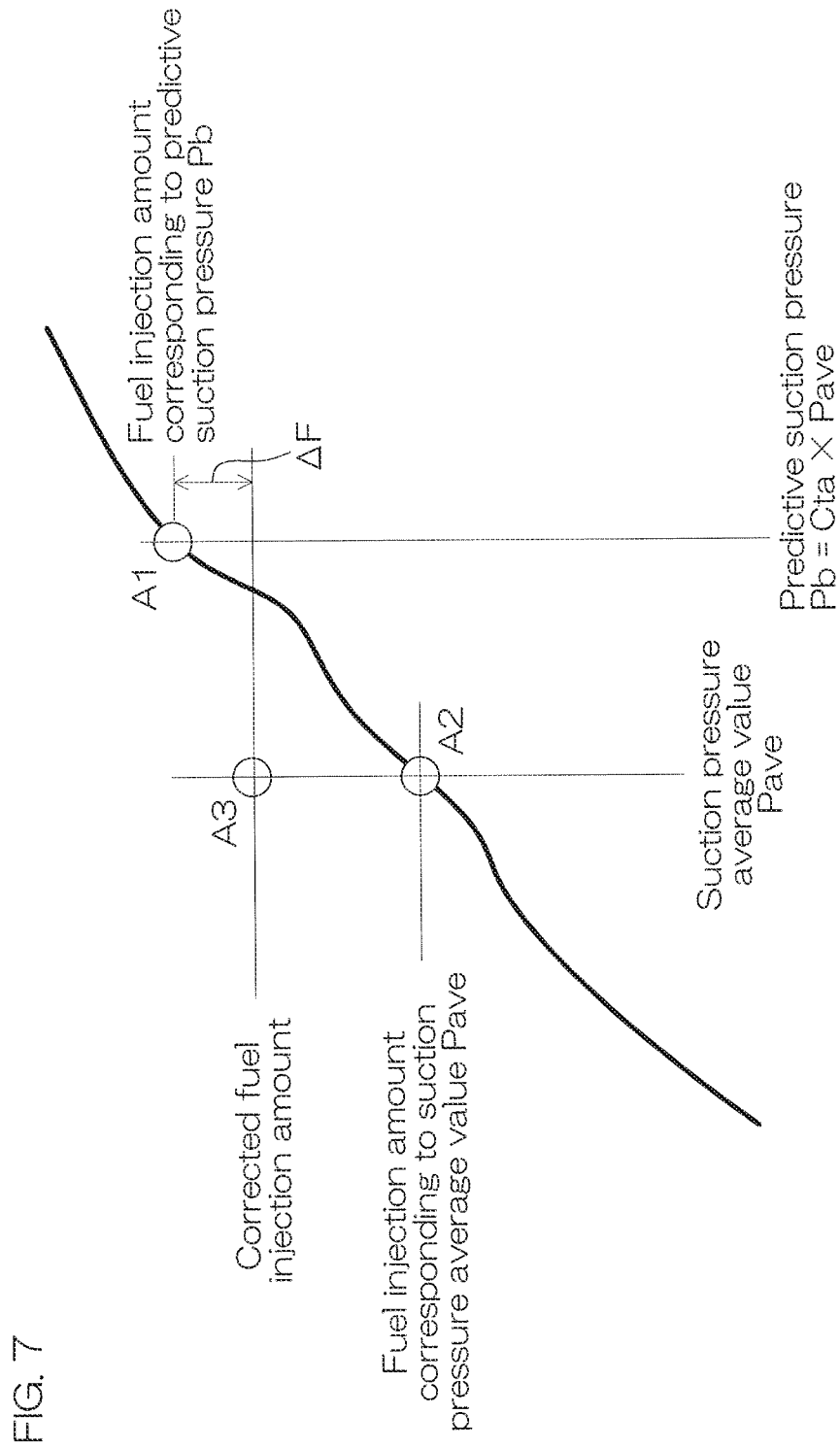
FIG. 7 is a view shown to describe an influence on the calculation of a fuel injection amount exerted by the correction of suction pressure in a transient operating state.

FIG. 7 is a view shown to describe an influence on the calculation of a fuel injection amount exerted by the correction of suction pressure in a transient operating state, and is an enlarged view of a portion of the suction pressure/injection amount characteristic. If the correction value Cta is 10%, it is determined that the operating state is a transient operating state, and the suction pressure average value Pave at the point of time when the fuel injection amount is calculated is multiplied by the correction value Cta (=10%), and the predictive suction pressure Pb is calculated. Based on this predictive suction pressure Pb, a fuel injection amount on a suction pressure/injection amount characteristic line is determined as shown by reference sign A1.

If, based on the suction pressure average value Pave at the point of time when the fuel injection amount is calculated, the fuel injection amount on the suction pressure/injection amount characteristic line is used and applied as shown by reference sign A2, a lean state is reached in which fuel is insufficient with respect to the air-fuel ratio request value. Additionally, even if a corrected fuel injection amount is determined by multiplying the fuel injection amount by the correction value Cta (=10%), the fuel injection amount will not become an adequate value, and a deviation ΔF from an appropriate fuel injection amount will occur as shown by reference sign A3. This can be an adequate value only when a change in the fuel injection amount with respect to suction pressure is linear.

As described above, according to a preferred embodiment of the present invention, the effective opening area of the throttle valve 55 is calculated based on the throttle opening degree, and the first-order lag filter value of the effective opening area is determined. Additionally, a ratio of the effective opening area to the first-order lag filter value is determined as a correction value Cta. On the other hand, predictive suction pressure Pb is determined by multiplying the suction pressure average value Pave detected by the suction pressure sensor 58 at the suction passage 45 (more specifically, behind the throttle valve 55) by the correction value Cta, and the fuel injection amount is calculated based on this predictive suction pressure Pb. The fuel injector 107 is driven based on that fuel injection amount.

The ratio of the effective opening area to the first-order lag filter value represents the degree of a change in the effective opening area, and constitutes an index to a transient operating state. Therefore, the value of this ratio is used as a correction value Cta by which the present suction pressure is corrected and by which suction pressure (predictive suction pressure) in the future is determined. A fuel injection amount is calculated based on predictive suction pressure Pb determined by use of this correction value Cta, and therefore the resultant fuel injection amount becomes an adequate value making it possible to satisfy an air-fuel ratio request value with high accuracy. As a result, it is possible to improve a combustion state.

Additionally, in a preferred embodiment of the present invention, a correction value Cta and a threshold value are compared with each other, and, based on this comparison result, effective/ineffective switching of correction of the suction pressure average value Pave by use of the correction value Cta is performed. More specifically, a value obtained by multiplying the suction pressure average value Pave by the correction value Cta is set as the predictive suction pressure Pb when the correction value Cta exceeds the first threshold value, whereas the suction pressure average value Pave is used as the predictive suction pressure Pb without being corrected when the correction value Cta becomes less than the second threshold value. Thus, the predictive suction pressure Pb is determined by correcting the suction pressure average value Pave by use of the correction value Cta in a transient operating state, whereas the suction pressure average value Pave is used as the predictive suction pressure Pb without being corrected in a stationary state. Thus, the effective/ineffective switching of correction is performed depending on the state, and, as a result, it is possible to obtain proper predictive suction pressure Pb, and it is possible to realize an excellent combustion state in either of the stationary state and the transient operating state.

The second threshold value is a value equal to or less than the first threshold value as mentioned above. If the second threshold value is smaller than the first threshold value, it becomes possible to provide hysteresis to switching between a state in which correction is effective and a state in which correction is ineffective, thus making it possible to significantly reduce or prevent chattering.

Additionally, in a preferred embodiment of the present invention, the engine 101 is a four-stroke engine, and the fuel injector 107 injects fuel at a predetermined fuel injection timing. The predictive suction pressure calculator 76 calculates predictive suction pressure Pb at the end of the suction stroke (specifically, at a timing at which the suction valve 42 is closed) at a calculation timing prior to a fuel injection timing. If the suction pressure at the end of the suction stroke is confirmed, it is possible to accurately determine an amount of air introduced into a combustion chamber (cylinder 40). A fuel injection amount appropriate to this amount of air is set, thus making it possible to achieve a request air-fuel ratio and making it possible to improve a combustion state correspondingly.

Additionally, based on predictive suction pressure Pb calculated by the predictive suction pressure calculator 76 and based on an engine rotation speed, volumetric efficiency is calculated, and, based on the resultant volumetric efficiency, a fuel injection amount is calculated. The use of the predictive suction pressure Pb makes it possible to accurately determine volumetric efficiency and makes it possible to determine an appropriate fuel injection amount correspondingly. This makes it possible to improve a combustion state.

Additionally, based on predictive suction pressure Pb calculated by the predictive suction pressure calculator 76 and based on an engine rotation speed, an air-fuel ratio request value is calculated, and, based on the resultant air-fuel ratio request value, a fuel injection amount is calculated. The use of the predictive suction pressure Pb makes it possible to calculate an appropriate air-fuel ratio request value and thus makes it possible to determine a proper fuel injection amount by which the appropriate air-fuel ratio is achieved. This makes it possible to improve a combustion state.

The relationship of the fuel injection amount with respect to the predictive suction pressure Pb may be fixed so as to be a nonlinear relationship as described above. If the relationship between the suction pressure and the fuel injection amount is nonlinear, it is impossible to determine a fuel injection amount approximating the adequate value even if the fuel injection amount is corrected based on the correction value Cta mentioned above, and a more complicated calculation is required (see FIG. 7). In a preferred embodiment of the present invention, the predictive suction pressure Pb is determined while correcting the suction pressure average value Pave, and, based on the resultant predictive suction pressure Pb, a fuel injection amount is determined. This configuration makes it possible to determine a proper fuel injection amount without performing a complicated calculation even if the relationship between the suction pressure and the fuel injection amount is nonlinear.

It should be noted that not a suction pressure sensor but an airflow sensor is mounted on an engine used on the ground, such as an engine of a ground-running vehicle, and a configuration that directly detects a suction-air amount is used. However, a detection unit of the airflow sensor cannot withstand a usage environment in which water and/or salt enter the detection unit. Therefore, in a vessel engine, it is not realistic to use the airflow sensor, and the suction pressure sensor is used instead of the airflow sensor.

Although preferred embodiments of the present invention have been described as above, the present invention can be embodied in yet other modes as described below, and various design changes can be made within the scope of the matter recited in the appended claims.

The correction value Cta is compared with the first threshold value and with the second threshold value as described in the above-described preferred embodiments, and yet the number of threshold values may be only one. In other words, if the correction value Cta exceeds this threshold value, a value obtained by correcting the suction pressure average value Pave by use of the correction value Cta may be set as predictive suction pressure Pb, and, if the correction value Cta is less than this threshold value, the suction pressure average value Pave may be set as predictive suction pressure Pb without being corrected.

Additionally, a value obtained by correcting the suction pressure average value Pave by use of the correction value Cta may be used as predictive suction pressure Pb without performing the effective/ineffective switching of correction by use of the correction value Cta, i.e., without reaching a determination about the correction value Cta, and without depending on the operating state.

A steer-by-wire configuration is used in which a steering operation is performed by the steering mechanism 104 actuated by the steering actuator 111 in accordance with the operation of the steering wheel 30 as described in the above preferred embodiments, and yet the operation of the steering wheel 30 may be mechanically transmitted to the steering mechanism 104.

A drive-by-wire configuration is used in which the throttle actuator 108 actuates the throttle valve 55 in accordance with the operation of the remote-control lever 32 as described in the above-described preferred embodiments, and yet the operation of the remote-control lever 32 may be mechanically transmitted to the throttle valve 55.

The propulsion apparatus as an outboard motor has been mainly described in the above preferred embodiments, and yet the propulsion apparatus may be another type. The other types of the propulsion apparatus include, for example, an inboard motor, an inboard/outboard motor, a water-jet propulsion apparatus, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel injection controller for a vessel engine to drive a propulsion apparatus mounted in a vessel, the fuel injection controller configured or programmed to execute functions of:
   an effective opening area calculator to calculate an effective opening area of a throttle valve of the vessel engine based on a throttle opening degree of the vessel engine;
   a filter value calculator to determine a first-order lag filter value of the effective opening area determined by the effective opening area calculator;
   a correction value calculator to determine a ratio of the effective opening area to the first-order lag filter value as a correction value;
   a predictive suction pressure calculator to determine predictive suction pressure by multiplying an average value of suction pressure detected at a suction passage of the vessel engine by the correction value determined by the correction value calculator;
   a fuel injection amount calculator to calculate a fuel injection amount based on the predictive suction pressure determined by the predictive suction pressure calculator; and
   a fuel injection driver to drive a fuel injector of the vessel engine based on the fuel injection amount calculated by the fuel injection amount calculator.

2. The fuel injection controller according to claim 1, wherein the predictive suction pressure calculator is configured or programmed to compare the correction value determined by the correction value calculator and a predetermined threshold value with each other, and select either one of a value obtained by multiplying the average value of suction pressure detected at the suction passage by the correction value and the average value of the suction pressure based on a resultant comparison result, and set the selected value as the predictive suction pressure.

3. The fuel injection controller according to claim 1, wherein when the correction value determined by the correction value calculator exceeds a first threshold value, the predictive suction pressure calculator is configured or programmed to determine predictive suction pressure by multiplying the average value of suction pressure detected at the suction passage by the correction value; and when the correction value becomes less than a second threshold value equal to or less than the first threshold value, the predictive suction pressure calculator is configured or programmed to set the average value of the suction pressure as predictive suction pressure.

4. The fuel injection controller according to claim 1, wherein the vessel engine is a four-stroke engine;

the fuel injection driver is configured or programmed to drive the fuel injector so that fuel is injected at a predetermined fuel injection timing; and the predictive suction pressure calculator is configured or programmed to calculate predictive suction pressure at an end of a suction stroke at a calculation timing prior to the fuel injection timing.

5. The fuel injection controller according to claim 1, wherein the fuel injection amount calculator includes a volumetric efficiency calculator to calculate volumetric efficiency based on the predictive suction pressure calculated by the predictive suction pressure calculator and based on a rotation speed of the vessel engine; and the fuel injection amount calculator is configured or programmed to calculate the fuel injection amount based on the volumetric efficiency calculated by the volumetric efficiency calculator.

6. The fuel injection controller according to claim 1, wherein the fuel injection amount calculator includes an air-fuel-ratio request value calculator to calculate an air-fuel ratio request value based on the predictive suction pressure calculated by the predictive suction pressure calculator and based on a rotation speed of the vessel engine; and the fuel injection amount calculator is configured or programmed to calculate the fuel injection amount based on the air-fuel ratio request value calculated by the air-fuel-ratio request value calculator.

7. The fuel injection controller according to claim 1, wherein a relationship of the fuel injection amount calculated by the fuel injection amount calculator with respect to the predictive suction pressure is nonlinear.

8. A vessel engine comprising:

a throttle opening degree sensor to detect a throttle opening degree;

a suction pressure sensor to detect suction pressure at a suction passage;

a fuel injector to inject fuel; and the fuel injection controller according to claim 1.

9. A vessel propulsion apparatus comprising:

the vessel engine according to claim 8; and a propulsion member to be driven by the vessel engine.

10. A vessel comprising:

a hull; and the vessel propulsion apparatus according to claim 9 mounted on the hull.

* * * * *